US012241680B2

(12) United States Patent  
Schroeder

(10) Patent No.: US 12,241,680 B2  
(45) Date of Patent: Mar. 4, 2025

(54) INVENTORY MANAGEMENT SYSTEM IN A REFRIGERATOR APPLIANCE

(71) Applicant: Haier US Appliance Solutions, Inc., Wilmington, DE (US)

(72) Inventor: Michael Goodman Schroeder, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 585 days.

(21) Appl. No.: 17/469,376

(22) Filed: Sep. 8, 2021

(65) Prior Publication Data

US 2023/0076984 A1      Mar. 9, 2023

(51) Int. Cl.
*F25D 29/00*      (2006.01)
*G06V 20/52*      (2022.01)
*G06V 20/68*      (2022.01)

(52) U.S. Cl.
CPC ............ *F25D 29/00* (2013.01); *G06V 20/52* (2022.01); *F25D 2500/06* (2013.01); *G06V 20/68* (2022.01)

(58) Field of Classification Search
None
See application file for complete search history.

(56) References Cited

U.S. PATENT DOCUMENTS

| | | | |
|---|---|---|---|
| 2017/0219276 A1* | 8/2017 | Wang | H04N 23/90 |
| 2018/0335252 A1* | 11/2018 | Oh | F25D 29/00 |
| 2020/0097776 A1* | 3/2020 | Kim | G06T 7/70 |

FOREIGN PATENT DOCUMENTS

| | | |
|---|---|---|
| CN | 107886028 A | 4/2018 |
| CN | 110119675 A | 8/2019 |
| CN | 111503990 A | 8/2020 |
| CN | 111767759 A | 10/2020 |
| EP | 3754546 A1 | 12/2020 |

* cited by examiner

*Primary Examiner* — Fan Zhang
(74) *Attorney, Agent, or Firm* — Dority & Manning, P.A.

(57) ABSTRACT

A refrigerator appliance is provided including a cabinet defining a chilled chamber, a door rotatably hinged to the cabinet to provide selective access to the chilled chamber, and an inventory management system mounted within the chilled chamber for monitoring objects positioned within the chilled chamber. The inventory management system includes a camera assembly that obtains images of food items as they are being added to or removed from the chilled chamber. A controller of the appliance analyzes the images using a machine learning image recognition process to identify an object and a corresponding confidence score related to the object identification. Historical inventory data is then be used to adjust the confidence score and modify an inventory list when the adjusted confidence score exceeds a high confidence threshold.

17 Claims, 5 Drawing Sheets

INVENTORY MANAGEMENT SYSTEM IN A REFRIGERATOR APPLIANCE

FIELD OF THE INVENTION

The present subject matter relates generally to refrigerator appliances, and more particularly an inventory management system in a refrigerator appliance and methods of operating the same.

BACKGROUND OF THE INVENTION

Refrigerator appliances generally include a cabinet that defines a chilled chamber for receipt of food articles for storage. In addition, refrigerator appliances include one or more doors rotatably hinged to the cabinet to permit selective access to food items stored in chilled chamber(s). The refrigerator appliances can also include various storage components mounted within the chilled chamber and designed to facilitate storage of food items therein. Such storage components can include racks, bins, shelves, or drawers that receive food items and assist with organizing and arranging of such food items within the chilled chamber.

Notably, it is frequently desirable to have an updated inventory of items that are present within the refrigerator appliance, e.g., to facilitate reorders, to ensure food freshness or avoid spoilage, etc. Thus, it may be desirable to monitor food items that are added to or removed from refrigerator appliance and obtain other information related to the presence, quantity, or quality of such food items. Certain conventional refrigerator appliances have systems for monitoring food items in the refrigerator appliance. However, such systems often require user interaction, e.g., via direct input through a control panel as to the food items added or removed.

By contrast, certain appliances include a camera for monitoring food items as they are added to or removed from the refrigerator appliance. However, conventional camera systems may have trouble identifying particular objects, distinguishing between similar products, and precisely identifying the location of an object within the chilled chamber. Moreover, refrigerator appliances that use cameras commonly rely on simple image analysis and fail to use existing knowledge related to current inventory or historical inventory storage practices when identifying an object.

Accordingly, a refrigerator appliance with systems for improved inventory management would be useful. More particularly, a refrigerator appliance that includes an inventory management system that is capable of monitoring entering and exiting inventory with improved confidence would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a refrigerator appliance is provided including a cabinet defining a chilled chamber, a door being rotatably hinged to the cabinet to provide selective access to the chilled chamber, and a camera assembly for monitoring the chilled chamber. A controller is operably coupled to the camera assembly and is configured to obtain an image using the camera assembly, analyze the image to identify an object being added to or removed from the chilled chamber and a raw confidence score associated with the object that was identified, determine that the raw confidence score falls below a high confidence threshold, obtain an adjusted confidence score associated with the object based at least in part on the raw confidence score and historical inventory data, determine that the adjusted confidence score exceeds the high confidence threshold, and modify an inventory list in response to determining that the adjusted confidence score exceeds the high confidence threshold.

In another exemplary embodiment, a method of implementing inventory management within a refrigerator appliance is provided. The refrigerator appliance includes a chilled chamber and a camera assembly positioned for monitoring the chilled chamber. The method includes obtaining an image using the camera assembly, analyzing the image to identify an object being added to or removed from the chilled chamber and a raw confidence score associated with the object that was identified, determining that the raw confidence score falls below a high confidence threshold, obtaining an adjusted confidence score associated with the object based at least in part on the raw confidence score and historical inventory data, determining that the adjusted confidence score exceeds the high confidence threshold, and modifying an inventory list in response to determining that the adjusted confidence score exceeds the high confidence threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
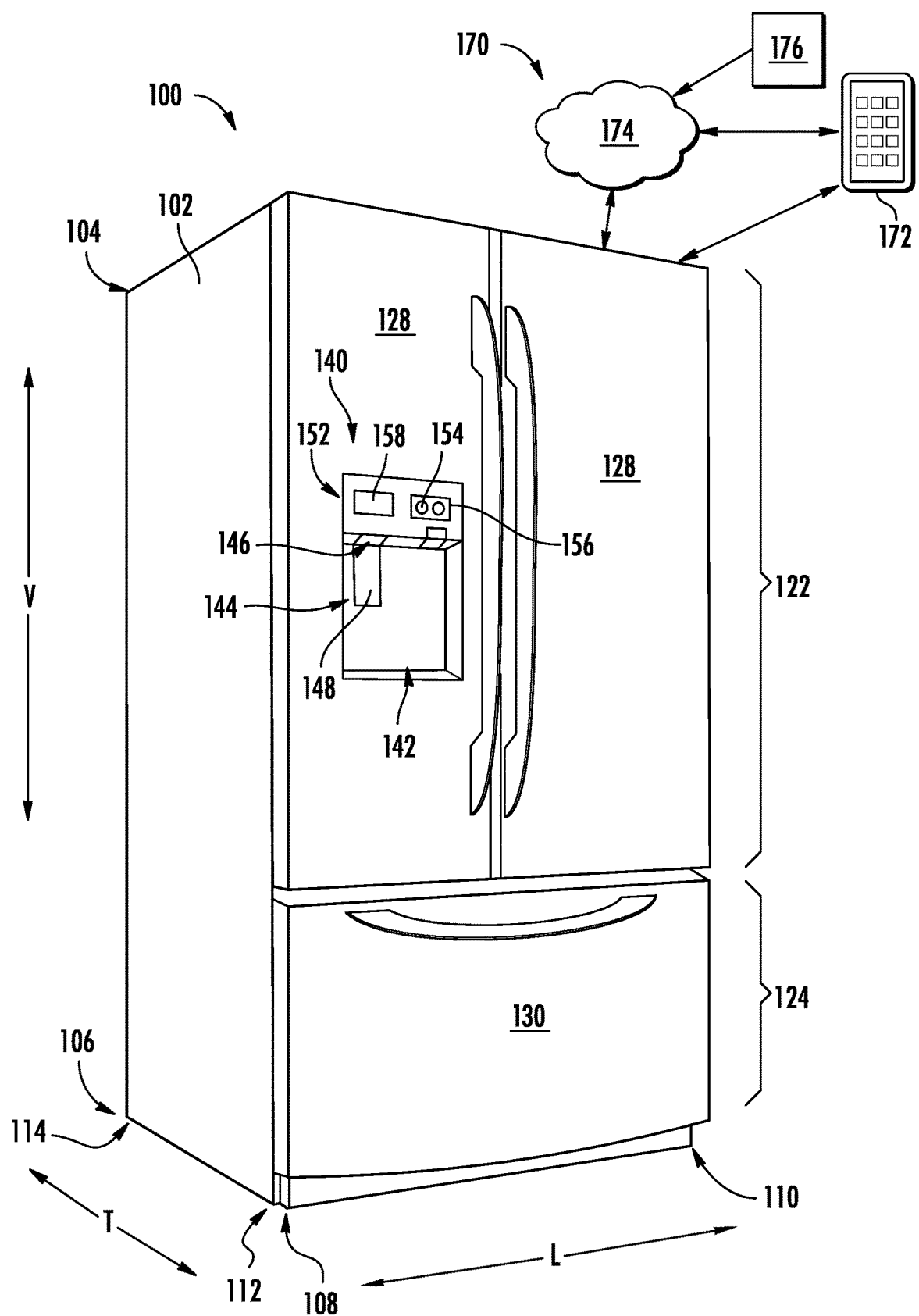
FIG. 1 provides a perspective view of a refrigerator appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
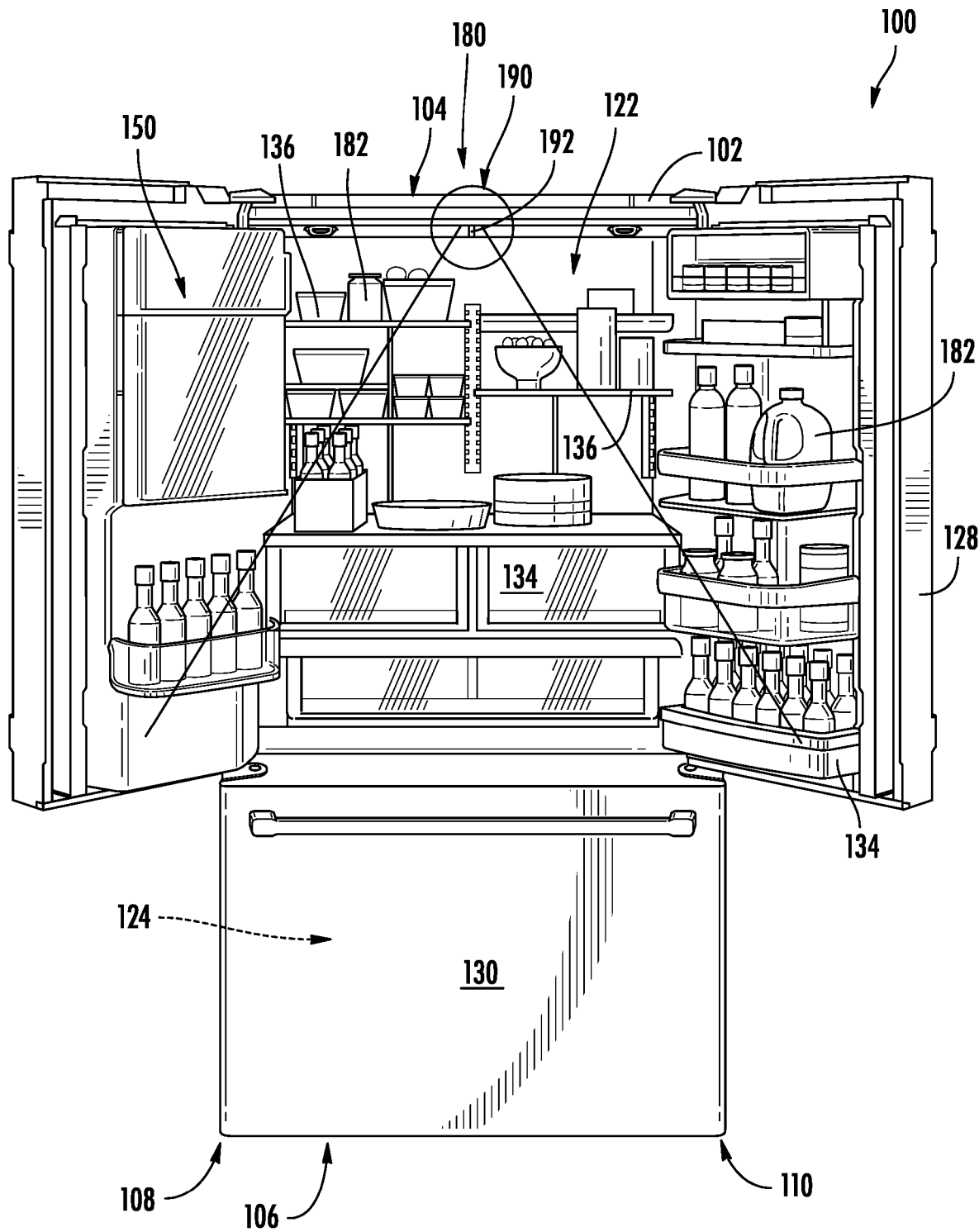
FIG. 2 provides a perspective view of the exemplary refrigerator appliance of FIG. 1, with the doors of the fresh food chamber shown in an open position to reveal an inventory management system according to an exemplary embodiment of the present subject matter.

Referring now to the figures, an exemplary appliance will be described in accordance with exemplary aspects of the present subject matter. Specifically, FIG. 1 provides a perspective view of an exemplary refrigerator appliance 100 and FIG. 2 illustrates refrigerator appliance 100 with some of the doors in the open position. As illustrated, refrigerator appliance 100 generally defines a vertical direction V, a lateral direction L, and a transverse direction T, each of which is mutually perpendicular, such that an orthogonal coordinate system is generally defined.

According to exemplary embodiments, refrigerator appliance 100 includes a cabinet 102 that is generally configured for containing and/or supporting various components of refrigerator appliance 100 and which may also define one or more internal chambers or compartments of refrigerator appliance 100. In this regard, as used herein, the terms "cabinet," "housing," and the like are generally intended to refer to an outer frame or support structure for refrigerator appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of refrigerator appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing appliance 102.

Housing 102 defines chilled chambers for receipt of food items for storage. In particular, housing 102 defines fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Moreover, aspects of the present subject matter may be applied to other appliances as well. Consequently, the description set forth herein is for illustrative purposes only and is not intended to be limiting in any aspect to any particular appliance or configuration.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. In general, refrigerator doors 128 form a seal over a front opening 132 defined by cabinet 102 (e.g., extending within a plane defined by the vertical direction V and the lateral direction L). In this regard, a user may place items within fresh food chamber 122 through front opening 132 when refrigerator doors 128 are open and may then close refrigerator doors 128 to facilitate climate control. Refrigerator doors 128 and freezer door 130 are shown in the closed configuration in FIG. 1. One skilled in the art will appreciate that other chamber and door configurations are possible and within the scope of the present invention.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Referring again to FIG. 1, a dispensing assembly 140 will be described according to exemplary embodiments of the present subject matter. Although several different exemplary embodiments of dispensing assembly 140 will be illustrated and described, similar reference numerals may be used to refer to similar components and features. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142. By contrast, refrigerator door 128 may define an icebox compartment 150 (FIG. 2) housing an icemaker and an ice storage bin (not shown) that are configured to supply ice to dispenser recess 142.

A control panel 152 is provided for controlling the mode of operation. For example, control panel 152 includes one or more selector inputs 154, such as knobs, buttons, touchscreen interfaces, etc., such as a water dispensing button and an ice-dispensing button, for selecting a desired mode of operation such as crushed or non-crushed ice. In addition, inputs 154 may be used to specify a fill volume or method of operating dispensing assembly 140. In this regard, inputs 154 may be in communication with a processing device or controller 156. Signals generated in controller 156 operate refrigerator appliance 100 and dispensing assembly 140 in response to selector inputs 154. Additionally, a display 158, such as an indicator light or a screen, may be provided on control panel 152. Display 158 may be in communication with controller 156, and may display information in response to signals from controller 156.

As used herein, "processing device" or "controller" may refer to one or more microprocessors or semiconductor devices and is not restricted necessarily to a single element. The processing device can be programmed to operate refrigerator appliance 100, dispensing assembly 140 and other components of refrigerator appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible by a processing device, including instructions that can be executed by processing device. Optionally, the instructions can be software or any set of instructions and/or data that when executed by the processing device, cause the processing device to perform operations.

Referring still to FIG. 1, a schematic diagram of an external communication system 170 will be described according to an exemplary embodiment of the present subject matter. In general, external communication system 170 is configured for permitting interaction, data transfer, and other communications between refrigerator appliance 100 and one or more external devices. For example, this communication may be used to provide and receive operating parameters, user instructions or notifications, performance characteristics, user preferences, or any other suitable information for improved performance of refrigerator appliance 100. In addition, it should be appreciated that external communication system 170 may be used to transfer data or other information to improve performance of one or more external devices or appliances and/or improve user interaction with such devices.

For example, external communication system 170 permits controller 156 of refrigerator appliance 100 to communicate with a separate device external to refrigerator appliance 100, referred to generally herein as an external device 172. As described in more detail below, these communications may be facilitated using a wired or wireless connection, such as via a network 174. In general, external device 172 may be any suitable device separate from refrigerator appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with refrigerator appliance 100 and/or external device 172 through network 174. In this regard, for example, remote server 176 may be a cloud-based server 176, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control refrigerator appliance 100, etc. In addition, external device 172 and remote server 176 may communicate with refrigerator appliance 100 to communicate similar information. According to exemplary embodiments, remote server 176 may be configured to receive and analyze images obtained by camera assembly 190, e.g., to facilitate inventory analysis.

In general, communication between refrigerator appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with refrigerator appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Referring now generally to FIG. 2, refrigerator appliance 100 may further include an inventory management system 180 that is generally configured to monitor one or more chambers of refrigerator appliance 100 to monitor the addition or removal of inventory. More specifically, as described in more detail below, inventory management system 180 may include a plurality of sensors, cameras, or other detection devices that are used to monitor fresh food chamber 122 to detect objects (e.g., identified generally by reference numeral 182) that are positioned in or removed from fresh food chamber 122. In this regard, inventory management system 180 may use data from each of these devices to obtain a complete representation or knowledge of the identity, position, and/or other qualitative or quantitative characteristics of objects 182 within fresh food chamber 122. Although inventory management system 180 is described herein as monitoring fresh food chamber 122 for the detection of objects 182, it should be appreciated that aspects of the present subject matter may be used to monitor objects or items in any other suitable appliance, chamber, etc.

As shown schematically in FIG. 2, inventory management system 180 may include a camera assembly 190 that is generally positioned and configured for obtaining images of refrigerator appliance 100 during operation. Specifically, according to the illustrated embodiment, camera assembly 190 includes one or more cameras 192 that are mounted to cabinet 102, to doors 128, or are otherwise positioned in view of fresh food chamber 122. Although camera assembly 190 is described herein as being used to monitor fresh food chamber 122 of refrigerator appliance 100, it should be appreciated that aspects of the present subject matter may be used to monitor any other suitable regions of any other suitable appliance, e.g., such as freezer chamber 124. As best shown in FIG. 2, a camera 192 of camera assembly 190 is mounted to cabinet 102 at front opening 132 of fresh food chamber 122 and is oriented to have a field of view directed across front opening 132 and/or into fresh food chamber 122.

Although a single camera 192 is illustrated in FIG. 2, it should be appreciated that camera assembly 190 may include a plurality of cameras 192 positioned within cabinet 102, wherein each of the plurality of cameras 192 has a specified monitoring zone or range positioned around fresh food chamber 122. In this regard, for example, the field of view of each camera 192 may be limited to or focused on a specific area within fresh food chamber 122. For example, an inventory management system 182 may include a plurality of cameras 192 that are mounted to a sidewall of fresh food chamber 122 and may be spaced apart along the vertical direction V to cover different monitoring zones.

Notably, however, it may be desirable to position each camera 192 proximate front opening 132 of fresh food chamber 122 and orient each camera 192 such that the field-of-view is directed into fresh food chamber 122. In this manner, privacy concerns related to obtaining images of the user of the appliance 100 may be mitigated or avoided altogether. According to exemplary embodiments, camera assembly 190 may be used to facilitate an inventory management process for refrigerator appliance 100. As such, each camera 192 may be positioned at an opening to fresh food chamber 122 to monitor food items (identified generally as objects 182) that are being added to or removed from fresh food chamber 122.

According to still other embodiments, each camera 192 may be oriented in any other suitable manner for monitoring any other suitable region within or around refrigerator appliance 100. It should be appreciated that according to alternative embodiments, camera assembly 190 may include any suitable number, type, size, and configuration of camera (s) 192 for obtaining images of any suitable areas or regions within or around refrigerator appliance 100. In addition, it should be appreciated that each camera 192 may include features for adjusting the field-of-view and/or orientation.

It should be appreciated that the images obtained by camera assembly 190 may vary in number, frequency, angle, resolution, detail, etc. in order to improve the clarity of the particular regions surrounding or within refrigerator appliance 100. In addition, according to exemplary embodiments, controller 156 may be configured for illuminating the chilled chamber using one or more light sources prior to obtaining images. Notably, controller 156 of refrigerator appliance 100 (or any other suitable dedicated controller) may be communicatively coupled to camera assembly 190 and may be programmed or configured for analyzing the images obtained by camera assembly 190, e.g., in order to identify items being added or removed from refrigerator appliance 100, as described in detail below.

In general, controller 136 may be operably coupled to camera assembly 190 for analyzing one or more images obtained by camera assembly 190 to extract useful information regarding objects 182 located within fresh food chamber 122. In this regard, for example, images obtained by camera assembly 190 may be used to extract a barcode, identify a product, monitor the motion of the product, or obtain other product information related to object 182. Notably, this analysis may be performed locally (e.g., on controller 156) or may be transmitted to a remote server (e.g., remote server 176 via external communication network 170) for analysis. Such analysis is intended to facilitate inventory management, e.g., by identifying a food item being added to or removed from the chilled chamber.

Now that the construction and configuration of refrigerator appliance 100 and camera assembly 190 have been presented according to an exemplary embodiment of the present subject matter, an exemplary method 200 for operating a camera assembly 190 is provided. Method 200 can be used to operate camera assembly 190, or to operate any other suitable camera assembly for monitoring appliance operation or inventory. In this regard, for example, controller 156 may be configured for implementing method 200. However, it should be appreciated that the exemplary method 200 is discussed herein only to describe exemplary aspects of the present subject matter, and is not intended to be limiting.

Figure 3:
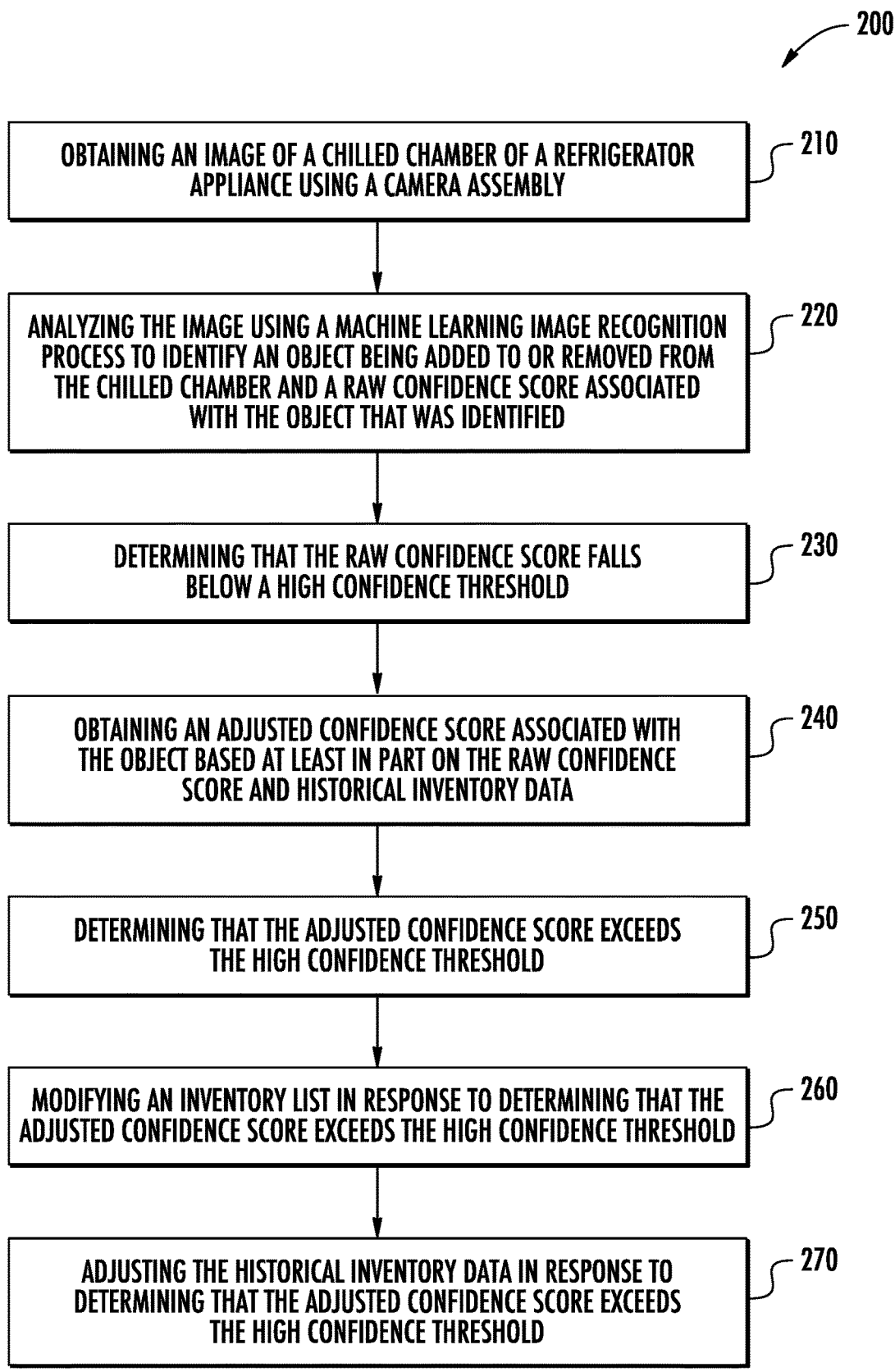
FIG. 3 provides a method for operating the exemplary inventory management system of FIG. 2 according to an exemplary embodiment of the present subject matter.

As shown in FIG. 3, method 200 includes, at step 210, obtaining an image of a chilled chamber of a refrigerator appliance using a camera assembly. For example, continuing the example from above, camera assembly 190 of refrigerator appliance 100 may obtain an image 300 (e.g., as shown for example in FIG. 4) within fresh food chamber 122, which may include in its field-of-view a plurality of objects 182. In this regard, camera assembly 190 of refrigerator appliance 100 may obtain one or more images (e.g., such as image 300) of fresh food chamber 122, freezer chamber 124, or any other zone or region within or around refrigerator appliance 100.

Figure 4:
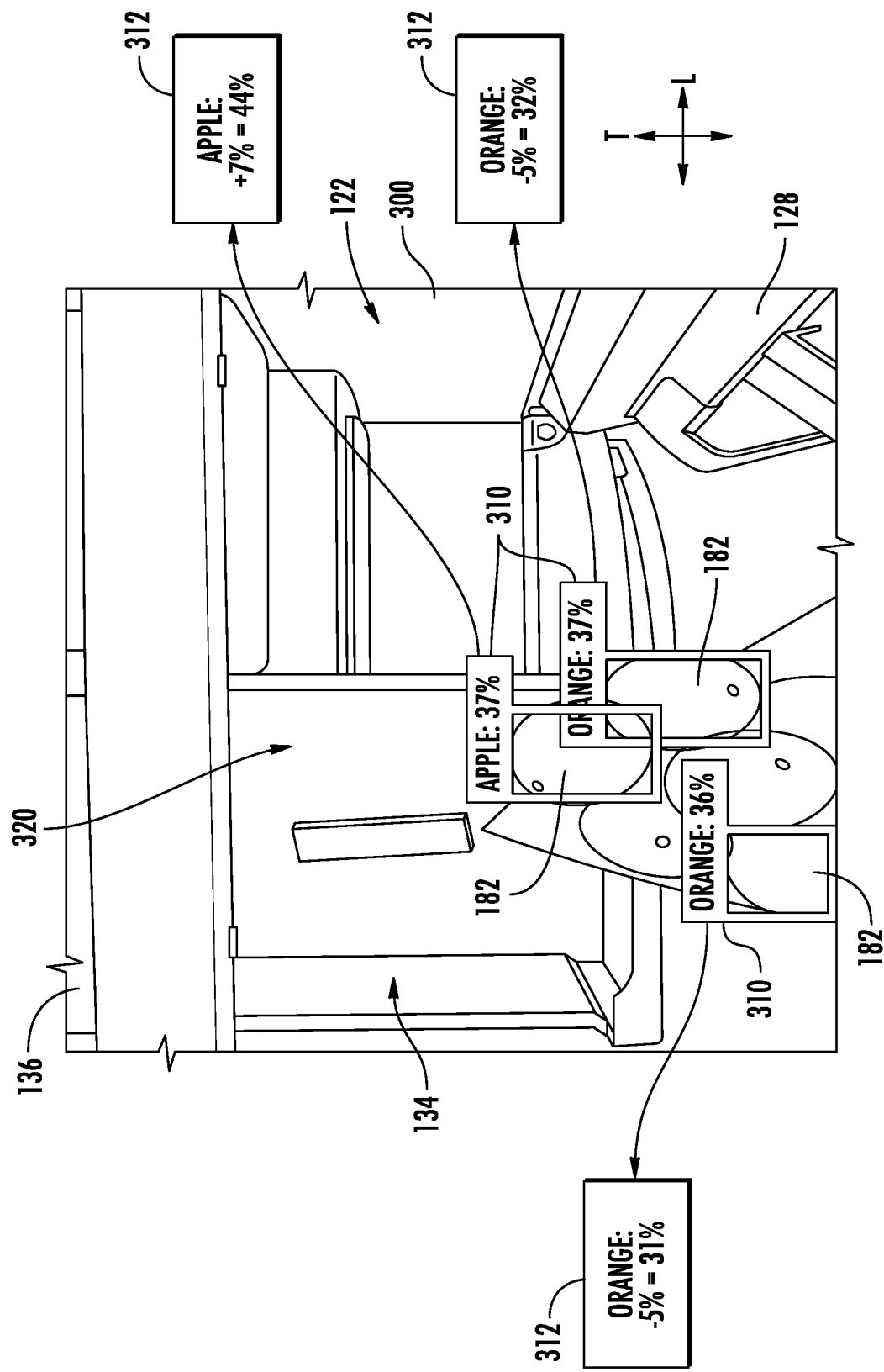
FIG. 4 provides an image obtained using a camera of the exemplary inventory management system of FIG. 2 according to an exemplary embodiment of the present subject matter.

Specifically, according to an exemplary embodiment, camera 192 is oriented down from a top center of cabinet 102 and has a field-of-view (e.g., as shown in the photos of FIG. 4) that covers a width of fresh food chamber 122. Moreover, this field-of-view may be centered on front opening 132 at a front of cabinet 102, e.g., where refrigerator doors 128 are seated against a front of cabinet 102. In this manner, the field-of-view of camera 192, and the resulting images obtained, may capture any motion or movement of an object into and/or out of fresh food chamber 122. The images obtained by camera assembly 190 may include one or more still images, one or more video clips, or any other suitable type and number of images suitable for identification of food items (e.g., identified generally by reference numeral 182) or inventory analysis.

Notably, camera assembly 190 may obtain images upon any suitable trigger, such as a time-based imaging schedule where camera assembly 190 periodically images and monitors fresh food chamber 122. According to still other embodiments, camera assembly 190 may periodically take low-resolution images until motion is detected (e.g., via image differentiation of low-resolution images), at which time one or more high-resolution images may be obtained. According to still other embodiments, refrigerator appliance 100 may include one or more motion sensors (e.g., optical, acoustic, electromagnetic, etc.) that are triggered when an object 182 is being added to or removed from fresh food chamber 122, and camera assembly 190 may be operably coupled to such motion sensors to obtain images of the object 182 during such movement.

According to still other embodiments, refrigerator appliance 100 may include a door switch that detects when refrigerator door 128 is opened, at which point camera assembly 190 may begin obtaining one or more images. According to exemplary embodiments, the image 300 may be obtained continuously or periodically while refrigerator doors 128 are open. In this regard, obtaining image 300 may include determining that the door of the refrigerator appliance is open and capturing images at a set frame rate while the door is open.

Notably, the motion of the food items between image frames may be used to determine whether the food item 182 is being removed from or added into fresh food chamber 122. It should be appreciated that the images obtained by camera assembly 190 may vary in number, frequency, angle, resolution, detail, etc. in order to improve the clarity of food items 182. In addition, according to exemplary embodiments, controller 156 may be configured for illuminating a refrigerator light (not shown) while obtaining image 300. Other suitable triggers are possible and within the scope of the present subject matter.

Step 220 includes analyzing the image using to identify an object being added to or removed from the chilled chamber and a raw confidence score (identified generally by reference numeral 310) associated with the object that was identified. It should be appreciated that this analysis may utilize any suitable image analysis techniques, image decomposition, image segmentation, image processing, etc. This analysis may be performed entirely by controller 156, may be offloaded to a remote server for analysis, may be analyzed with user assistance (e.g., via control panel 152), or may be analyzed in any other suitable manner. According to exemplary embodiments of the present subject matter, the analysis performed at step 220 may include a machine learning image recognition process.

According to exemplary embodiments, this image analysis may use any suitable image processing technique, image recognition process, etc. As used herein, the terms "image analysis" and the like may be used generally to refer to any suitable method of observation, analysis, image decomposition, feature extraction, image classification, etc. of one or more images, videos, or other visual representations of an object. As explained in more detail below, this image analysis may include the implementation of image processing techniques, image recognition techniques, or any suitable combination thereof. In this regard, the image analysis may use any suitable image analysis software or algorithm to constantly or periodically monitor a moving object within fresh food chamber 122. It should be appreciated that this image analysis or processing may be performed locally (e.g., by controller 156) or remotely (e.g., by offloading image data to a remote server or network, e.g., remote server 176).

Specifically, the analysis of the one or more images may include implementation an image processing algorithm. As used herein, the terms "image processing" and the like are generally intended to refer to any suitable methods or algorithms for analyzing images that do not rely on artificial intelligence or machine learning techniques (e.g., in contrast to the machine learning image recognition processes described below). For example, the image processing algorithm may rely on image differentiation, e.g., such as a pixel-by-pixel comparison of two sequential images. This comparison may help identify substantial differences between the sequentially obtained images, e.g., to identify movement, the presence of a particular object, the existence of a certain condition, etc. For example, one or more reference images may be obtained when a particular condition exists, and these references images may be stored for future comparison with images obtained during appliance operation. Similarities and/or differences between the reference image and the obtained image may be used to extract useful information for improving appliance performance. For example, image differentiation may be used to determine when a pixel level motion metric passes a predetermined motion threshold.

The processing algorithm may further include measures for isolating or eliminating noise in the image comparison, e.g., due to image resolution, data transmission errors, inconsistent lighting, or other imaging errors. By eliminating such noise, the image processing algorithms may improve accurate object detection, avoid erroneous object detection, and isolate the important object, region, or pattern within an image. In addition, or alternatively, the image processing algorithms may use other suitable techniques for recognizing or identifying particular items or objects, such as edge matching, divide-and-conquer searching, greyscale matching, histograms of receptive field responses, or another suitable routine (e.g., executed at the controller 156 based on one or more captured images from one or more cameras). Other image processing techniques are possible and within the scope of the present subject matter.

In addition to the image processing techniques described above, the image analysis may include utilizing artificial intelligence ("AI"), such as a machine learning image recognition process, a neural network classification module, any other suitable artificial intelligence (AI) technique, and/or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

In this regard, the image recognition process may use any suitable artificial intelligence technique, for example, any suitable machine learning technique, or for example, any suitable deep learning technique. According to an exemplary embodiment, the image recognition process may include the implementation of a form of image recognition called region based convolutional neural network ("R-CNN") image recognition. Generally speaking, R-CNN may include taking an input image and extracting region proposals that include a potential object or region of an image. In this regard, a "region proposal" may be one or more regions in an image that could belong to a particular object or may include adjacent regions that share common pixel characteristics. A convolutional neural network is then used to compute features from the region proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like, as opposed to a regular R-CNN architecture. For example, mask R-CNN may be based on fast R-CNN which is slightly different than R-CNN. For example, R-CNN first applies a convolutional neural network ("CNN") and then allocates it to zone recommendations on the covn5 property map instead of the initially split into zone recommendations. In addition, according to exemplary embodiments, standard CNN may be used to obtain, identify, or detect any other qualitative or quantitative data related to one or more objects or regions within the one or more images. In addition, a K-means algorithm may be used.

According to still other embodiments, the image recognition process may use any other suitable neural network process while remaining within the scope of the present subject matter. For example, the step of analyzing the one or more images may include using a deep belief network ("DBN") image recognition process. A DBN image recognition process may generally include stacking many individual unsupervised networks that use each network's hidden layer as the input for the next layer. According to still other embodiments, the step of analyzing one or more images may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present subject matter.

In addition, it should be appreciated that various transfer techniques may be used but use of such techniques is not required. If using transfer techniques learning, a neural network architecture may be pretrained such as VGG16/VGG19/ResNet50 with a public dataset then the last layer may be retrained with an appliance specific dataset. In addition, or alternatively, the image recognition process may include detection of certain conditions based on comparison of initial conditions, may rely on image subtraction techniques, image stacking techniques, image concatenation, etc. For example, the subtracted image may be used to train a neural network with multiple classes for future comparison and image classification.

It should be appreciated that the machine learning image recognition models may be actively trained by the appliance with new images, may be supplied with training data from the manufacturer or from another remote source, or may be trained in any other suitable manner. For example, according to exemplary embodiments, this image recognition process relies at least in part on a neural network trained with a plurality of images of the appliance in different configurations, experiencing different conditions, or being interacted with in different manners. This training data may be stored locally or remotely and may be communicated to a remote server for training other appliances and models.

It should be appreciated that image processing and machine learning image recognition processes may be used together to facilitate improved image analysis, object detection, or to extract other useful qualitative or quantitative data or information from the one or more images that may be used to improve the operation or performance of the appliance. Indeed, the methods described herein may use any or all of these techniques interchangeably to improve image analysis process and facilitate improved appliance performance and consumer satisfaction. The image processing algorithms and machine learning image recognition processes described herein are only exemplary and are not intended to limit the scope of the present subject matter in any manner.

Referring now briefly to FIG. 4, one or more images (e.g., image 300) may be obtained by camera assembly 190 during the implementation of method 200. As illustrated, the image analysis performed at step 220 may identify a plurality of objects 182 within image 300, e.g., based on training of the machine learning model using similar food products 182 (e.g., as illustrated herein as either apples or oranges). As noted briefly above, in addition to an object identification, the machine learning image recognition process may provide a raw confidence score (e.g., as identified generally by reference numeral 310 for each of the objects 182 identified in FIG. 4). In this regard, for example, the raw confidence score 310 may generally represent the probability that the object has been properly identified by the machine learning model, e.g., expressed in a confidence percentage with 100% corresponding to full confidence.

In general, raw confidence score 310 may be a direct output of the machine learning image recognition model upon analyzing image 300 and may be based on any suitable characteristics of the object 182 being monitored or tracked. For example, each food object 182 may have identifiable features, such as stems, discolorations, imperfections, or other features which may be identifiable and associated with that particular object 182 (e.g., similar to a fingerprint for that object). Machine learning image recognition model may identify each object based on its particular fingerprint and may use identifiable features from other images to increase the accuracy of object identification. Notably, however, historical data related to item the storage and an inventory analysis may be used to improve raw confidence score 310 to facilitate improved inventory management. Accordingly, aspects of the present subject matter described below may relate to method steps for improving raw confidence score 310, particularly when it falls below a suitable confidence threshold.

In this regard, for example, step 230 may include determining that the raw confidence score falls 310 below a high confidence threshold. This high confidence threshold may be predetermined and programmed into controller 156 as a threshold beyond which object identification should result in a change in the refrigerator inventory record or list. In addition, step 230 may include determining that the raw confidence score is above a low confidence threshold, e.g., such that the object 182 has been identified, the that the confidence score associated with that identification is not suitably high enough to merit a change in inventory.

Step 240 generally includes obtaining an adjusted confidence score (e.g., identified generally by reference numeral 312 in FIG. 4) associated with the object based at least in part on the raw confidence score 310 and historical inventory data. As used herein, the terms "historical inventory data" and the like are generally intended to refer to any data or information related to the storage of items or food objects within refrigerator appliance 100. According to exemplary embodiments, this historical inventory data may be used to generate the adjusted confidence score 312 based on historical practices associated with refrigerator appliance 100. Although exemplary historical inventory data will be described herein, it should be appreciated that the data described is only exemplary and is used to facilitate discussion of aspects of the present subject matter without limiting the scope of the present subject matter.

For example, according to exemplary embodiments, the historical inventory data may include information related to common food items or objects 182 stored in various spatial zones (e.g., identified generally by reference numeral 320 in FIG. 4). This historical inventory data may be broken down into object classes and subclasses. In this regard, for example, item classes may include vegetables (e.g., including subclasses such as peas, carrots, corn, etc.), fruits (e.g., including subclasses such as berries, cut fruit, etc.), premade meals (e.g., including subclasses such as lasagna, pizza, microwave meals, etc.), desserts (e.g., including subclasses such as ice cream, novelties, candy, etc.), meats (e.g., including subclasses such as chicken, beef, pork, etc.), and other classes.

In addition, the historical inventory data may include locations associated with each of the various objects 182 that might be stored within refrigerator appliance 100. In this regard, as mentioned above, chilled chamber 122 may be broken down into a plurality of spatial zones 320 and the frequency with which certain objects 182 are stored within the respective spatial zones 320 may be recorded in the historical inventory data. For example, as shown in FIG. 4, the spatial zone 320 being accessed is the bottom left bin 134 of chilled chamber 122. Accordingly, the historical inventory data may include a list of objects commonly placed within spatial zone 320 (e.g., in bottom left bin 134). This list of objects may include object classifications as described above, along with the number of occurrences where that object was placed in the particular spatial zone 320, a frequency of such placements, or any other data related to the likelihood that particular object 182 would be positioned within a particular spatial zone 320.

According to exemplary embodiments, the adjusted confidence score 312 may be determined by controller 156 based on the raw confidence score 310 and historical inventory data. For example, if the raw confidence score 310 is relatively low but the historical inventory data indicates that the identified object is very likely to be stored in the specified spatial zone 320, adjusted confidence score 312 may be increased relative to raw confidence score 310. By contrast, if an object is identified with a relatively low raw confidence score 310 and the historical inventory data indicates that such an object is not typically stored in the spatial zone 320, the adjusted confidence score 312 may be reduced relative to raw confidence score 310.

As explained above, step 240 may include identifying a spatial zone within the chilled chamber where the object was added or removed, determining that a food type of the object is identical to a common food type stored in the spatial zone, and increasing the raw confidence score to the adjusted confidence score. For example, as illustrated in FIG. 4, step 220 of analyzing the image 300 using the machine learning image recognition model has identified fruit being positioned within the bottom left bin 134. Specifically, this step identifies an apple with 37% confidence and two oranges with 36% and 37% confidence, respectively. In addition, the historical inventory data indicates that apples are very commonly stored in this spatial zone 320 while oranges are rarely or never stored in the spatial zone 320. Accordingly, raw confidence score 310 may be boosted for the object identified as an apple (e.g., from 37% to 44%) while raw confidence scores 310 associated with the objects identified as oranges may be reduced (e.g., by 5% respectively).

According to exemplary embodiments, step 250 may include determining that the adjusted confidence score exceeds the high confidence threshold. In this regard, step 240 may generally be used to boost the confidence of the object identified in step 220 and may thus facilitate improved inventory management. By contrast, if the adjusted confidence score still falls below the confidence threshold necessary to make inventory adjustments, method 200 may include querying the user of refrigerator appliance 100 as to the identity of the object or otherwise taking no further action and/or making no changes to the appliance inventory.

Step 260 includes modifying an inventory list in response to determining that the adjusted confidence score exceeds the high confidence threshold. In this regard, by identifying whether food items 182 are being added to or removed from fresh food chamber 122, controller 156 may monitor and track inventory within refrigerator appliance 100. For example, controller 156 may maintain a record of food items positioned within or removed from fresh food chamber 122. Continuing the example from above related to FIG. 4, controller 156 may add one apple to the appliance inventory list. In addition, refrigerator appliance 100 may ask the user to input the identity of the two objects identified as oranges, e.g., via control panel 152 or external device 172.

In addition to adjusting the actual appliance inventory, method 200 may include updating the historical inventory data based on items or objects 182 added to or removed from refrigerator appliance 100. In this regard, for example, step 270 may include adjusting the historical inventory data in response to determining that the adjusted confidence score exceeds the high confidence threshold. Thus, as apples are more frequently stored in lower left bin 134, controller 156 may be programmed to make larger adjustments to raw confidence score 310 to achieve adjusted confidence score 312. Thus, by tracking event occurrences (e.g., when certain objects are positioned within certain spatial zones 320), the historical inventory data may be improved and result in more accurate adjustments to confidence scores and improved inventory analysis and management.

According to exemplary embodiments, method 200 may further include determining that the raw confidence score 310 exceeds the high confidence threshold. In this case, no determination of the adjusted confidence score 312 may be needed in order to make an adjustment to the appliance inventory. Accordingly, when the raw confidence score 310 is this high, controller 156 may both adjust the historical inventory data and modify the inventory list for refrigerator appliance 100. By contrast, method 200 may further include determining that the object cannot be identified with any level of confidence. In such a situation, method 200 may include taking no further action or querying the user as to the identity of the object, e.g., via control panel 152 or external device 172.

Figure 5:
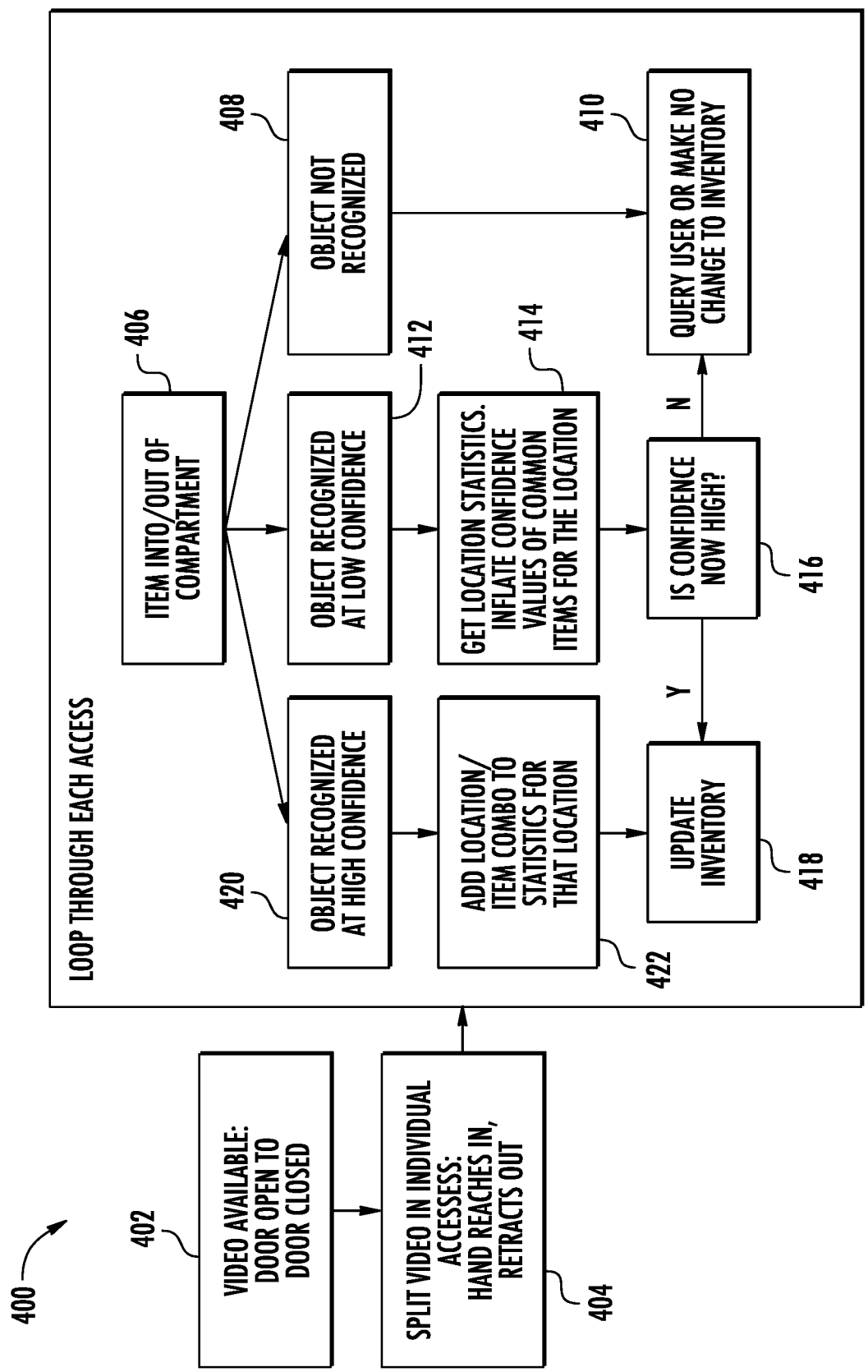
FIG. 5 provides a flow diagram of an exemplary process for implementing an inventory management method in a refrigerator appliance according to an exemplary embodiment of the present subject matter.

Referring now briefly to FIG. 5, an exemplary flow diagram of an inventory management method 400 that may be implemented by refrigerator appliance 100 will be described according to an exemplary embodiment of the present subject matter. According to exemplary embodiments, method 400 may be similar to or interchangeable with method 200 and may be implemented by controller 156 of refrigerator appliance 100. As shown, at step 402, controller 156 may determine that an image should be taken, e.g., by determining that the door has been opened. Step 404 may include obtaining one or more images or video and determining whether objects are being added to or removed from the chilled chamber 122.

Each time an object is added to or removed from chilled chamber 122, analysis of the image may be performed at step 406, e.g., to identify the object and the corresponding confidence score related to such object identification. For example, this image analysis may be the same or similar as that described above with respect to step 220. Step 408 may include determining that no object is recognized for identifiable from the image and step 410 may include querying the user as to the object identification and/or making no changes to the inventory or historical inventory data.

By contrast, step 412 may include identifying an object, but at a low confidence level, e.g., a confidence level that is not sufficient to merit changes in the appliance inventory or historical inventory data. Step 414 may include getting location statistics and attempting to adjust the confidence score associated with the object identification, e.g., based on historical inventory data. If, at step 416, the adjusted confidence score is still not above the high confidence threshold, method 400 may proceed to step 410 (as described above). By contrast, if the adjusted confidence score now exceeds the high confidence threshold, step 418 may include updating the appliance inventory and/or adjusting the historical inventory data. Step 420 may include identifying an object at a high confidence level, e.g., confidence level above which controller 156 should update the appliance inventory list and/or adjust the historical inventory data. Step 422 may include adjusting historical inventory data, e.g., by adding the location, object identified, etc.

FIGS. 3 and 5 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 and method 400 are explained using refrigerator appliance 100 as an example, it should be appreciated that this method may be applied to the operation of any suitable refrigerator appliance or any other appliance where inventory management is desirable.

Aspects of the present subject matter are directed to systems and methods for using a camera assembly to facilitate inventory management in a refrigerator appliance. The camera assembly may include cameras that are mounted to the cabinet, placed on the bottom of doors, or positioned in any other manner for recording activity within one or more chilled chambers. An appliance controller may record common storage locations for different types of items. These historical statistics can be used to improved future object identification and inventory management, e.g., by adjusting a visual recognition confidence based on the storage location.

For example, the camera assembly may be used to monitor items that are added to and/or removed from different areas within the chilled chamber. The chilled chamber may be programmatically split into multiple spatial zones, may be split into quadrants for each level, or may be broken up into any other suitable virtual zones, spaces, or regions. When items are placed in a particular zone and are classified with a predetermined level of confidence, an occurrence of the item type or a more general item class may be added to the history for that zone. Statistics on common item placements may influence the overall confidence of object classification and inventory changes.

For instance, a low confidence inventory change may be boosted to a high confidence change if it is a common item type for the storage location. When the object recognized is at high confidence then the location is added or the object occurrence is added to statistics for that location is added and the inventory is updated based on that information. When the object recognized at low confidence then it will get location statistics or inflate confidence values of common items for the location. After that process, if the confidence level is high, the inventory may be updated. By contrast, if the confidence level is low, the controller may query a user to identify the item or makes no changes to the inventory.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
   a cabinet defining a chilled chamber, wherein the chilled chamber is divided into a plurality of spatial zones;
   a door being rotatably hinged to the cabinet to provide selective access to the chilled chamber;
   a camera assembly for monitoring the chilled chamber; and
   a controller operably coupled to the camera assembly, the controller being configured to:
      obtain an image using the camera assembly;
      analyze the image to identify an object being added to or removed from the chilled chamber and a raw confidence score associated with the object that was identified;
      determine that the raw confidence score falls below a high confidence threshold;

obtain an adjusted confidence score associated with the object based at least in part on the raw confidence score and historical inventory data, where obtaining the adjusted confidence score based at least in part on the raw confidence score and the historical inventory data comprises identify a spatial zone within the chilled chamber where the object was added or removed, determining that a food type of the object is identical to a common food type stored in the spatial zone, and increasing the raw confidence score to the adjusted confidence score;

determine that the adjusted confidence score exceeds the high confidence threshold; and modify an inventory list in response to determining that the adjusted confidence score exceeds the high confidence threshold.

2. The refrigerator appliance of claim 1, wherein the controller is configured to analyze the image using a machine learning image recognition process.

3. The refrigerator appliance of claim 2, wherein the machine learning image recognition process comprises at least one of a convolution neural network ("CNN"), a region-based convolution neural network ("R-CNN"), a deep belief network ("DBN"), or a deep neural network ("DNN") image recognition process.

4. The refrigerator appliance of claim 1, wherein the controller is further configured to:

adjust the historical inventory data in response to determining that the adjusted confidence score exceeds the high confidence threshold.

5. The refrigerator appliance of claim 4, wherein adjusting the historical inventory data comprises adding an event occurrence to the historical inventory data based on the object that was identified.

6. The refrigerator appliance of claim 1, wherein the controller is further configured to:

determine that the raw confidence score exceeds the high confidence threshold; and adjust the historical inventory data in response to determining that the raw confidence score exceeds the high confidence threshold.

7. The refrigerator appliance of claim 6, wherein the controller is further configured to:

modify the inventory list in response to determining that the raw confidence score exceeds the high confidence threshold.

8. The refrigerator appliance of claim 1, wherein the controller is further configured to:

determine that the object could not be identified; and query a user of the refrigerator appliance to identify the object.

9. The refrigerator appliance of claim 1, wherein modifying the inventory list comprises adding or removing the object from the inventory list.

10. The refrigerator appliance of claim 1, wherein the historical inventory data includes data related food types, classes, subclasses, and locations of potential objects stored within the chilled chamber.

11. The refrigerator appliance of claim 1, wherein the camera assembly comprises:

a camera mounted to the cabinet at a front opening of the chilled chamber, the camera being oriented to have a field of view directed into the chilled chamber.

12. The refrigerator appliance of claim 1, wherein the camera assembly comprises:

a plurality of cameras positioned within the cabinet, each of the plurality of cameras having a specified monitoring zone or range.

13. The refrigerator appliance of claim 1, wherein the controller is further configured to:

determine that the door of the refrigerator appliance is open; and obtain the image while the door is open.

14. A method of implementing inventory management within a refrigerator appliance, the refrigerator appliance comprising a chilled chamber and a camera assembly positioned for monitoring the chilled chamber, wherein the chilled chamber is divided into a plurality of spatial zones, the method comprising:

obtaining an image using the camera assembly;

analyzing the image to identify an object being added to or removed from the chilled chamber and a raw confidence score associated with the object that was identified;

determining that the raw confidence score falls below a high confidence threshold;

obtaining an adjusted confidence score associated with the object based at least in part on the raw confidence score and historical inventory data, wherein obtaining the adjusted confidence score based at least in part on the raw confidence score and the historical inventory data comprises identifying a spatial zone within the chilled chamber where the object was added or removed, determining that a food type of the object is identical to a common food type stored in the spatial zone, and increasing the raw confidence score to the adjusted confidence score;

determining that the adjusted confidence score exceeds the high confidence threshold; and modifying an inventory list in response to determining that the adjusted confidence score exceeds the high confidence threshold.

15. The method of claim 14, analyzing the image comprises using a machine learning image recognition process comprising at least one of a convolution neural network ("CNN"), a region-based convolution neural network ("R-CNN"), a deep belief network ("DBN"), or a deep neural network ("DNN") image recognition process.

16. The method of claim 14, further comprising:

determining that the raw confidence score exceeds the high confidence threshold; and adjusting the historical inventory data in response to determining that the raw confidence score exceeds the high confidence threshold.

17. The method of claim 14, further comprising:

determining that the object could not be identified; and querying a user of the refrigerator appliance to identify the object.

* * * * *